United States Patent [19]
Kondou

[11] Patent Number: 4,883,685
[45] Date of Patent: Nov. 28, 1989

[54] MESO-ERYTHRITOL HARD CANDY AND PROCESS FOR PRODUCING THE SAME

[75] Inventor: Tsutomu Kondou, Sagamihara, Japan

[73] Assignees: Mitsubishi Kasei Corporation; Nikken Chemicals Company, Limited, both of Japan

[21] Appl. No.: 231,220

[22] Filed: Aug. 11, 1988

[30] Foreign Application Priority Data

Aug. 14, 1987 [JP] Japan ................................ 62-202820

[51] Int. Cl.$^4$ ............................................... A23G 3/00
[52] U.S. Cl. .................................... 426/658; 426/660; 426/804; 426/548
[58] Field of Search ................ 426/660, 658, 548, 804

[56] References Cited

U.S. PATENT DOCUMENTS

| 3,332,783 | 7/1967 | Frey | 426/660 |
| 4,154,867 | 5/1979 | Aldrich et al. | 426/660 |
| 4,372,942 | 2/1983 | Cimiluca | 426/660 |
| 4,497,846 | 2/1985 | Boursier et al. | 426/660 |
| 4,528,206 | 7/1985 | Kastin | 426/660 |

OTHER PUBLICATIONS

The Merck Index, "Erythritol", Merck & Co., Rahway, N.J., 1968, p. 418.

Primary Examiner—Jeanette Hunter
Attorney, Agent, or Firm—Jordan B. Bierman

[57] ABSTRACT

A hard candy which comprises meso-erythritol and saccharides selected from among sugars and sugar alcohols other than meso-erythritol as the main components as well as a process for producing the same are disclosed. The hard candy of the present invention has an excellent texture and a high keeping quality, compared with conventional ones.

17 Claims, No Drawings

MESO-ERYTHRITOL HARD CANDY AND PROCESS FOR PRODUCING THE SAME

BACKGROUND OF THE INVENTION

1. Field of the Invention

This invention relates to a hard candy and a process for producing the same. More particularly, it relates to a hard candy excellent in texture and storability, as well as a process for producing the same.

2. Prior Art

A hard candy is produced by adding thick malt syrup to sugar, which is the main component, melting and concentrating the obtained mixture by heating, adding some additives such as colorant, perfume or organic acid, if required, thereto, molding the resulting mixture and then solidifying the same by cooling.

There are various hard candies such as drops and starch base candies. Recently it has been pointed out that the excessive intake of sugar causes an increase in the morbidity of decayed teeth and accelerates, for example, obesity and diabetes in humans from infants and school children to adults. Thus there is a marked tendency to substitute non caries-producing saccharides for sugar as a starting material of candies.

For example, JP-B-56-18180 (the term "JP-B" as used herein means an "examined Japanese Pat. Publication") has disclosed a sugar-free composition comprising erythritol for preventing or reducing tooth decay.

The anti tooth decay composition comprising erythritol as described above is suitable for, e.g., sugar free chewing gum, toothpaste, sweets, ice cream, carbonated drinks and mouth wash. It is particularly suitable for chewing gum and toothpaste.

However candies comprising meso-erythritol instead of sugar are highly brittle and easily broken during the production or distribution process. In addition, these candies have a poor texture.

SUMMARY OF THE INVENTION

It is an object of the present invention to provide a hard candy comprising meso-erythritol as the main component which has a lowered brittleness and an improved texture.

Accordingly the gist of the present invention resides in providing a hard candy which comprises meso-erythritol and saccharides selected from sugars and sugar alcohols other than meso-erythritol as the main components.

DETAILED DESCRIPTION OF THE INVENTION

The meso-erythritol to be used in the present invention is a sugar alcohol of a tetrose represented by the following formula.

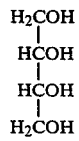

It has a molecular weight of 122 and a melting point of 119° C. and is present in the form of white crystals. It has an excellent appearance similar to that of granulated sugar. It is highly soluble in water, nondigestive and noncarries. Meso-erythritol occurs in natural substances such as algae and fungi and is contained in food products such as "sake", wine and soy sauce. It has a sweetness somewhat less intense than that of sucrose, i.e., corresponding to approximately 75 to 80 % thereof and somewhat more intense than that of glucose. The taste of meso-erythritol is similar to that of sugar but it leaves less aftertaste. Among sugar alcohols which are not appreciably colored by heating, meso-erythritol is hardly colored in particular.

Examples of the sugars to be used in the present invention include sucrose, glucose, thick malt syrup, fructose and isomerized sugars as well as noncorrosive ones such as coupling sugar, palatinose and isomaltose.

Examples of sugar alcohols other than meso-erythritol include sorbitol, maltitol, reducing oligosaccharide and xylitol.

The hard candy of the present invention may contain 30 to 80 % by weight, preferably 30 to 70 % by weight, of meso-erythritol. When the content of meso-erythritol is smaller than 30 % by weight, the obtained hard candy is highly hygroscopic. When it exceeds 80 % by weight, on the other hand, the obtained product has a rough texture and brittle.

A hard candy containing meso-erythritol, sugar(s), which do not exhibit a tendency to turn brown on heating, and sugar alcohol(s) may be produced by thoroughly mixing these materials and then melting the obtained mixture by heating. The melting may be conducted in a conventional manner employed in the art, namely, by feeding the sugar mixture into a pot and heating the same with steam.

When meso-erythritol is employed together with sugar(s) which are liable to be browned, for example, sucrose, the meso-erythritol is mixed with the sugar(s) and then 5 to 10 % by weight of water is added thereto. The resulting mixture is heated under stirring. When the temperature of the molten mixture reaches approximately 160° C., the heating is ceased and the mixture is cooled to 60 to 120° C. Then it is molded with, for example, a roller or a stamping machine or poured into a mold to thereby give a candy.

A candy dough containing 40 to 80% by weight of meso-erythritol would be frequently accompanied by the crystallization of the microcrystals of meso-erythritol, compared with one containing 30 to 40 % by weight of meso-erythritol. However the meso-erythritol present in the latter candy dough would readily crystallize by stirring or by adding a small amount of a sugar powder thereto. When slight crystallization is observed, the mixture is poured into a mold to thereby give a candy. The meso-erythritol contained in the former candy dough in an amount of 40 to 80 % by weight would frequently crystallize upon storage. Thus, this dough may be solidified by pouring into a mold before any crystallization is observed and then allowing to stand.

The hard candy of the present invention may further contain, for example, Aspartame, stevioside, sodium saccharate or Acesulfam K, if required, to thereby control or improve the degree or qualities of the sweetness.

The hard candy of the present invention, which is obtained by adding various sugars or sugar alcohols to meso-erythritol, shows excellent crystallization of fine crystals and thus has an excellent texture. Nevertheless, it is difficult to break.

The hard candy of the present invention can be readily produced and has a preferable flavor, an excellent texture and a high keeping quality.

Further the hard candy of the present invention has the following advantages.

Candies comprising noncorrosive sugars such as sorbitol or maltitol as the main component are highly hygroscopic and thus frequently suffer from an increase in the stickiness of the surface upon storage. As a result, the candies would adhere to each other or to the wrapping sheet and can be separated only with difficulty. Therefore it is required to store these candies in a moisture-proof container.

Similar to these candies, conventional ones comprising sugar or thick malt syrup are highly hygroscopic. In addition, sorbitol and maltitol are liable to adhere to teeth, in particular, artificial or false teeth. On the other hand, coupling sugar shows high foaming properties during cooking, which lowers the workability. When employed alone, the meso-erythritol, to be used in the present invention, in a molten state has a low viscosity and rapidly solidifies. Thus it can be treated with a tapping machine or a roller machine conventionally employed in the art only with difficulty. Although the molten meso-erythritol can be subjected to cast molding, the rapid crystallization thereof might result in the formation of a cavity at the center of the product. In addition, the product thus obtained has a coarse appearance and a not smooth but rough texture.

A candy comprising meso-erythritol alone has a serious disadvantage, namely, a high brittleness. Since meso-erythritol would readily crystallize, the appearance of this candy is similar to a mass of glass pieces. It is readily broken upon a slight shock to thereby lose the commercial value.

The present invention can provide a hard candy wherein these disadvantages of conventional ones are overcome.

To further illustrate the present invention, and not by way of limitation, the following Examples will be given. Unless otherwise indicated, all percents are by weight.

EXAMPLE 1

700 g of mesoerythritol and 300 g of maltitol were fed into a pot and molten by heating to 160° C. Then the molten mixture was cooled to 110° C. and poured into cylindrical molds of 5 mm in thickness and 15 mm in diameter. Five minutes thereafter, fine crystals were observed overall the product. Thus candies were obtained. Table 1 shows the evaluation of these candies.

TABLE 1

|  | Product of invention | Comparative product | |
|---|---|---|---|
|  | meso-erythritol 70% maltitol 30% | meso-erythritol 100% | maltitol 100% |
| Texture | good | poor (rough) | good |
| Hardness | good | poor (brittle) | good |
| Smoothness | good | poor (coarse) | good |
| Stickiness | no | no | sticky |
| Hygroscopicity Moisture Content (%) | 1.4 | 0 | 15.9 |

Note:
Texture: the surface condition.
Hygroscopicity: determined at 30° C. under a relative humidity of 79% for eight days.

EXAMPLE 2

700 g of meso-erythritol and 300 g of palatinose were fed into a pot and melted by heating to 150° C. Then the molten mixture was cooled to 130° C. and 10 g of an aqueous solution containing 5 g of stevioside was added thereto. The resulting mixture was thoroughly stirred and poured into cylindrical molds of 5 mm in thickness and 15 mm in diameter. Approximately five minutes thereafter, fine crystals were observed overall the product. Table 2 shows the evaluation of the obtained candies.

TABLE 2

|  | Product of invention | Comparative product | |
|---|---|---|---|
|  | meso-erythritol 70% palatinose 30% | meso-erythritol 100% | palatinose 100% |
| Texture | good | poor (rough) | good |
| Hardness | good | poor (brittle) | good |
| Smoothness | good | poor (coarse) | good |
| Stickiness | no | no | sticky |
| Hygroscopicity Moisture Content (%) | 3.0 | 0 | 11.2 |

EXAMPLE 3

600 g of meso-erythritol and 400 g of coupling sugar were fed into a pot and molten therein by heating to 150° C. Then the molten mixture was cooled to 80° C. and 2 g of an Aspartame was added thereto. After throughly mixing, the resulting mixture was molded into round candies of 8 mm in thickness and 20 mm in diameter with a stamping machine. Approximately four minutes thereafter, fine crystals were observed overall the product. Table 3 shows the evaluation of the obtained candies.

TABLE 3

|  | Product of invention | Comparative product | |
|---|---|---|---|
|  | meso-erythritol 60% Coupling Sugar 40% | meso-erythritol 100% | Coupling sugar 100% |
| Texture | good | poor (rough) | good |
| Hardness | good | poor (brittle) | good |
| Smoothness | good | poor (coarse) | good |
| Stickiness | no | no | sticky |
| Foaming | no | no | foamed |
| Hygroscopicity Moisture Content (%) | 1.7 | 0 | 8 |

In the above Examples, the following materials were employed:

Meso-erythritol: mfd. by Nikken Chemicals Co., Ltd.
Maltitol: mfd. by Tokyo Kasei Kogyo K.K.
Palatinose: mfd. by Mitsui Sugar Co., Ltd.
Coupling sugar: mfd. by Hayashibara Seibutsu Kagaku Kenkyusho K.K.
Stevioside (AX-P): Dainippon Ink and Chemical, Inc.
Aspartame: Ajinomoto Co., Inc.

While the invention has been described in detail and with reference to specific embodiment thereof, it will be apparent to one skilled in the art that various changes and modifications can be made therein without departing from the spirit and scope thereof.

What is claimed is:

1. A hard candy comprising 30% to 80% by weight of meso-erythritol based on said candy, and saccharides taken from the class consisting of sugar alcohols other than meso-erythritol and sugars as the main components.

2. The candy of claim 1 wherein said sugars are taken from the class consisting of sucrose, glucose, thick malt syrup, fructose, isomerized sugars, and non-corrosive sugars.

3. The candy of claim 2 wherein said non-corrosive sugars are taken from the class consisting of coupling sugars, palatinose, and isomaltose.

4. The candy of claim 1 wherein said sugar alcohols are taken from the class consisting of sorbitol, maltitol, reducing oligosaccharides, and xylitol.

5. The candy of claim 1 which contains 30% to 70% by weight of said meso-erythritol.

6. The candy of claim 1 wherein said saccharides are sugars and there is 5% to 10% by weight water in said candy.

7. The candy of claim 1 further comprising Aspartame, stevioside, sodium saccharate, and/or Acesulfam K.

8. A process for the production of a hard candy comprising melting a mixture comprising 30% to 80% by weight of meso-erythritol and at least one saccharide taken from the class consisting of sugar alcohols other than said meso-erythritol and sugars as the main components thereof, and cooling said mixture, whereby said mixture solidifies.

9. The process of claim 8 wherein said mixture comprises 30% to 70% by weight of said meso-erythritol and said saccharide.

10. The process of claim 8 wherein said mixture comprises said meso-erythritol and said sugar, said process further comprising adding 5% to 10% by weight of water to said mixture before said cooling.

11. The process of claim 3 wherein said mixture is stirred during said melting.

12. The process of claim 8 wherein said melting takes place at approximately 160° C.

13. The process of claim 8 wherein said cooling takes place at 60° to 130° C.

14. The process of claim 13 wherein said cooling takes place at 60° to 120° C.

15. The process of claim 8 wherein said mixture is stamped and/or molded into a desired shape.

16. The process of claim 8 further comprising introducing sugar powder into said mixture after said melting, allowing crystallization to start, and then pouring said mixture into a mold.

17. The process of claim 8 wherein said mixture further comprises Aspartame, sterioside, sodium saccharate, or Acesulfam K.

* * * * *